United States Patent [19]

Noël et al.

[11] 4,454,903

[45] Jun. 19, 1984

[54] MULTI-PLY BELT PNEUMATIC TIRE

[75] Inventors: Daniel R. F. Noël, Heinsch; Alain F. Florence, Bastogne, both of Belgium

[73] Assignee: The Goodyear Tire & Rubber Company, Akron, Ohio

[21] Appl. No.: 493,891

[22] Filed: May 12, 1983

[51] Int. Cl.³ .......................... B60C 9/20; B60C 13/00
[52] U.S. Cl. .......................... 152/361 DM; 152/200; 152/356 R; 152/361 FP
[58] Field of Search ............ 152/361 DM, 361 FP, 152/361 R, 356 R, 354 R, 354 RD, 330 R, 198, 200, 197, 201, 196, 202

[56] References Cited

U.S. PATENT DOCUMENTS

| | | | |
|---|---|---|---|
| 2,786,507 | 3/1957 | Howe et al. | 152/198 X |
| 3,831,656 | 8/1974 | Senger et al. | 152/361 DM X |
| 4,218,277 | 8/1980 | Van Der Burg | 152/361 DM X |
| 4,407,347 | 10/1983 | Mirtain | 152/361 FP |

FOREIGN PATENT DOCUMENTS

| | | | |
|---|---|---|---|
| 1603058 | 11/1981 | United Kingdom. | |
| 144413 | 5/1962 | U.S.S.R. | 152/361 DM |

Primary Examiner—William A. Powell
Assistant Examiner—Thomas Bokan
Attorney, Agent, or Firm—T. P. Lewandowski

[57] ABSTRACT

A pneumatic tire having a multi-ply reinforcing belt around a radial carcass. The plies of the belt are reinforced by non-metallic cords and the belt is protected from damage by an outer steel cord reinforced ply.

7 Claims, 4 Drawing Figures

MULTI-PLY BELT PNEUMATIC TIRE

This invention relates to pneumatic tires and in particular but not exclusively to heavy duty truck tires that are retreadable and are intended for use on rough terrain or dirt track roads.

Radial truck carcass tires are constructed with a multi-ply belt-like reinforcement around the radial carcass. When such a multi-ply reinforcement is made from a non-metallic reinforcing material such as aramid fiber, glass-fiber or any high modulus organic fiber, then the belts may be subject to damage. Such damage can occur during the service life of the tire by stones or other objects penetrating the tire tread, or more particularly such damage can be inflicted on the top breaker, adjacent the tire tread, during the buffing stage of a retreading operation.

The present invention to provide a tire in which the above problems are alleviated. Accordingly there is provided a heavy duty tire having a multi-ply circumferential reinforcing belt of non-metallic cord reinforced plies and a steel cord reinforced ply radially external of the non-metallic cord plies and which is of at least the same axial width as the radially outermost ply of the reinforcing belt.

Preferably the non-metallic reinforcing belt is made from aramid fibers and the steel cord belt is made of steel cord having corrosion resistant construction.

In a further embodiment of the invention the steel cord reinforced ply is at least as wide as the widest ply of the reinforcing belt.

The invention will be described by way of example and with reference to the accompanying drawings in which.

Figure 1:
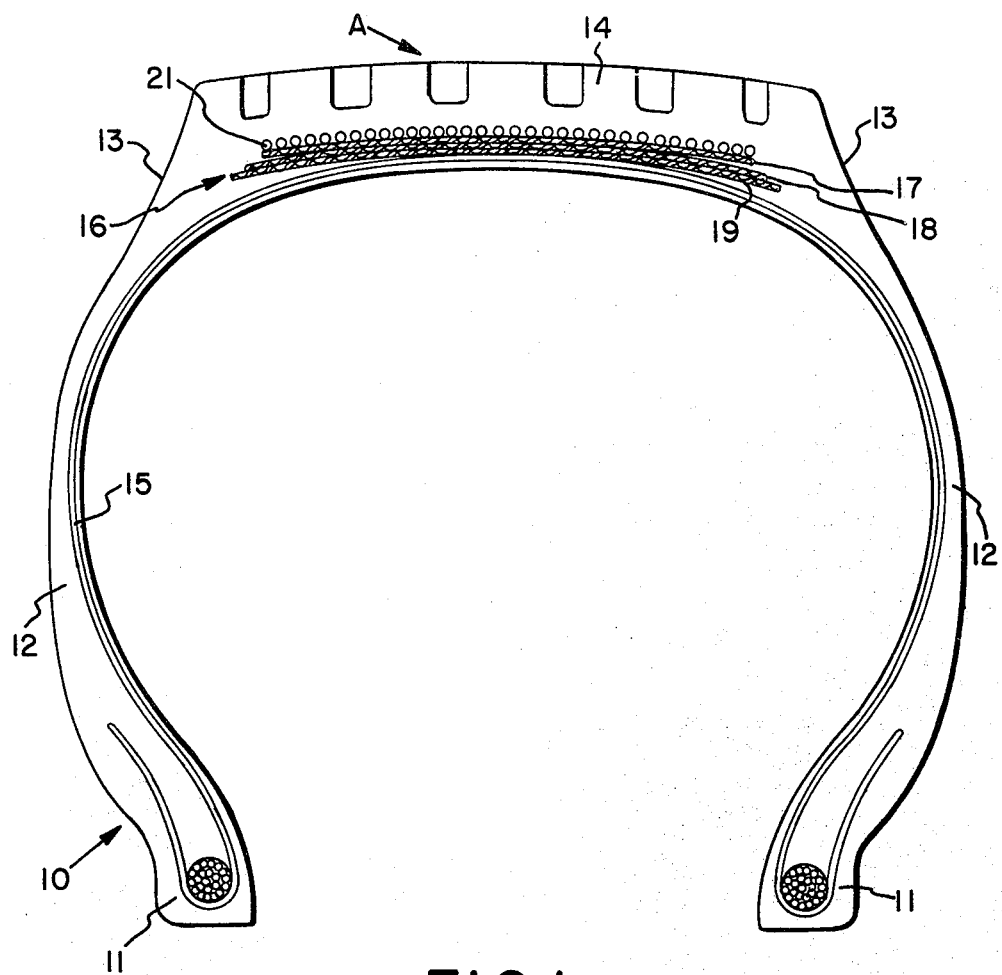
FIG. 1 is a cross section of a tire according to the present invention.
Figure 4:
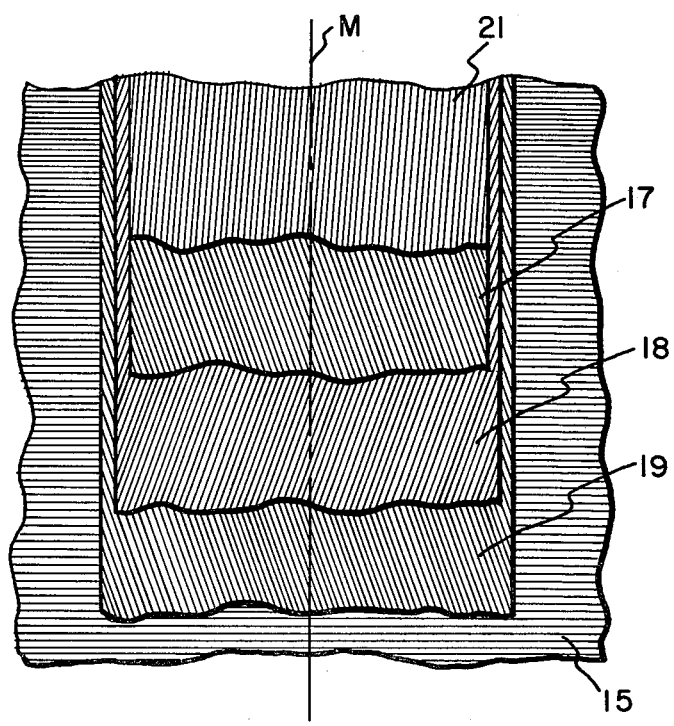
FIG. 4 is a view of the tire of FIG. 1 taken in the direction of arrow A and showing the reinforcing structure of the tire.

With reference to FIG. 1 and FIG. 4 of the accompanying drawing there is illustrated a heavy duty truck tire 10. The tire 10 has a pair of bead portions 11 for engaging the rim of a wheel (not shown) and a pair of sidewall portions 12 that each extend radially outwards from a respective bead portion 11. The tire sidewall portions 12 each extend into a shoulder area 13 of a circumferential tread 14.

A radial ply carcass 15, preferably made of a rubberized ply of steel cord, but which could be made of other rubberized ply materials e.g. rayon cord, extends between the two bead portions 11 providing support for the sidewall portions 12, shoulder area 13 and tread 14. The carcass 15 is shown to be of single ply construction but could have more than one ply. A multi-ply circumferential reinforcing belt 16 extends around the carcass 15 between the tread 14 and the crown of the carcass.

The reinforcing belt comprises three unfolded rubberized inner plies 17, 18 and 19 layered one on top of the other and decreasing slightly in axial width radially outwardly. The plies are reinforced with a non-metallic cord, preferably a textile cord such as aramid cord, glass fiber, or rayon. A radially outer rubberized ply 21 of steel cord is layered onto the outermost textile ply 17.

The steel cord ply 21 has the same axial extent as the outer textile ply 17.

The cords in each of the textile reinforced plies 17, 18, 19, are parallel within the respective ply and the cords make an angle with the mid-circumferential pane M of the tire of between 15° and 25° and the cords in the steel reinforcing ply 21 are parallel to each other and made an angle of between 0° and 10° with said plane. The textile cord is preferably of aramid fiber of the type known in the trade as 1500/3 Denier. The steel cord is preferably of a corrosion resistant open cord construction which allows rubber penetration so that each strand of the cord is surrounded by rubber. Adjacent plies are arranged so that the cords thereof cross each other. The Bias angle of steel cord could also lie between 15°–25° to be equal to the angle of the textile cords.

Because the outer ply 21 has steel cord reinforcement it can protect the textile cord reinforced plies from damage due to objects penetrating the tread 14 during the service life of the tire. Furthermore the steel cord of the ply 21 provides a layer under the tread area, down to which a retreader can buff the tire during retread operations without fear of damaging the radially inner textile plies.

Figure 2:
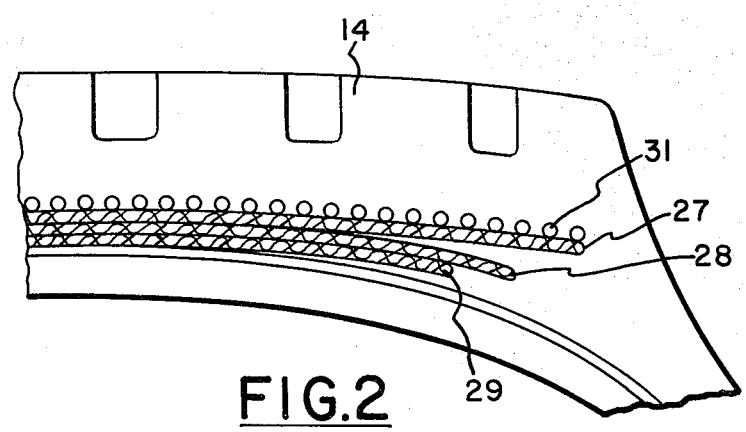
FIG. 2 is a fragmentary cross section through a second tire illustrating a second embodiment of the invention.
Figure 3:
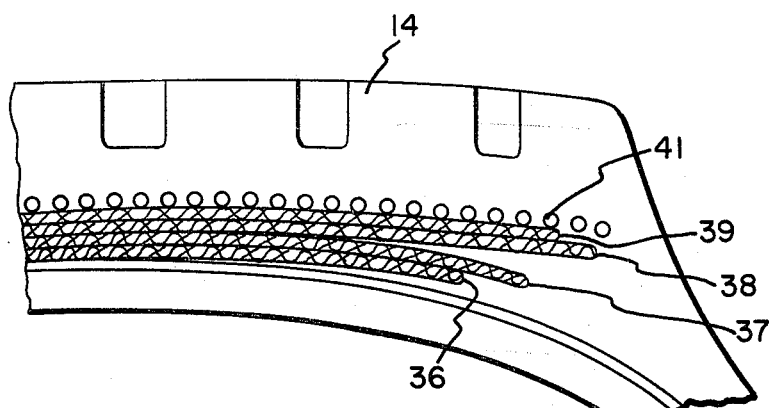
FIG. 3 is a fragmentary cross section through a third tire illustrating yet another embodiment of the invention.

Other embodiments of the invention are shown in FIGS. 2 and 3. In FIG. 2 the three textile reinforced plies 27, 28 and 29 increase in axial width radially outwardly. The steel cord ply 31 has the same axial width as the top ply 27 which is the widest of the textile reinforced plies.

Now referring to FIG. 3, there are shown four textile reinforced plies 36, 37, 38 and 39 which increase in axial width radially outwardly except for the outermost ply 39 which is of a lesser axial extent than the adjacent ply 38. The steel cord ply 41 is wider than the top textile ply and has the same axial extent as the widest textile ply 38.

Whilst the present invention has been described with reference to the drawing attached hereto, it should be understood that other and further modifications apart from those shown herein, may be within the scope and spirit of this invention. For example, some of the textile reinforced plies could be folded.

We claim:

1. A pneumatic tire having a multi-ply circumferential reinforcing belt of non-metallic cord reinforced plies, and a steel cord reinforced ply radially outwardly of the non-metallic cord plies and which is of at least the same axial width as the radially outer-most ply of the reinforcing belt.

2. A tire as claimed in claim 1 wherein the axial width of the steel cord ply is equal to the width of the outermost ply of the non-metallic plies.

3. A tire as claimed in claim 1 wherein the non-metallic cord of the reinforcing belt is aramid cord.

4. A tire as claimed in one of claim 1, claim 2 or claim 3 wherein the steel cords make a bias angle of between 0°–10° with the mid-circumferential plane of the tire.

5. A tire as claimed in claim 1 or claim 3 wherein the non-metallic cords of the plies of the reinforcing belt make an angle of between 15°–25° with the mid-circumferential plane of the tire.

6. A tire as claimed in claim 5 wherein the steel cords make a bias angle of between 15°–25° with the midcircumferential plane of the tire.

7. A pneumatic tire as claimed in claim 1, wherein the steel cord reinforced ply is of the same axial width as the widest ply of the reinforcing belt.

* * * * *